(12) United States Patent
Sobkowski et al.

(10) Patent No.: US 11,270,214 B1
(45) Date of Patent: Mar. 8, 2022

(54) PROVIDING THE BASIS FOR ETHICAL AI THROUGH EXPLANATIONS BY COUPLING NON-INTERPRETABLE AND INTERPRETABLE SYSTEMS

(71) Applicants: Isidore Samuel Sobkowski, Stamford, CT (US); Roy S. Freedman, New York City, NY (US)

(72) Inventors: Isidore Samuel Sobkowski, Stamford, CT (US); Roy S. Freedman, New York City, NY (US)

(*) Notice: Subject to any disclaimer, the term of this patent is extended or adjusted under 35 U.S.C. 154(b) by 12 days.

(21) Appl. No.: 17/215,205

(22) Filed: Mar. 29, 2021

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ........... G06N 5/04; G06N 20/00; G06N 5/045
See application file for complete search history.

(56) References Cited

U.S. PATENT DOCUMENTS

| | | | |
|---|---|---|---|
| 4,979,126 A | 12/1990 | Pao et al. | |
| 5,438,644 A | 8/1995 | Fu | |
| 6,336,109 B2 | 1/2002 | Howard | |
| 7,979,247 B2 | 7/2011 | Butterfield et al. | |
| 8,056,046 B2 | 11/2011 | Denby et al. | |
| 9,836,455 B2 | 12/2017 | Martens et al. | |
| 2004/0093316 A1 | 5/2004 | Howard et al. | |
| 2019/0236134 A1 | 8/2019 | Galitsky | |
| 2020/0074331 A1* | 3/2020 | Arendt | G06K 9/6276 |
| 2021/0256377 A1* | 8/2021 | Dalli | G06N 5/045 |

OTHER PUBLICATIONS

Zili Meng, "Interpreting Deep Learning-Based Networking Systems", SIGCOMM '20, Aug. 10-14, 2020, Virtual Event, NY, USA (Year: 2020).*
Fisher, D. H., & McKusick, K. B. (1989), "An empirical comparison of ID3 and back-propagation", IJCAI, pp. 788-793.
Breslow, L. A., & Aha, D. W. (1997), "Simplifying decision trees: A survey", Knowledge Engineering Review, 12(1), pp. 1-40.
Esmeir, S., & Markovitch, S. (2007), "Anytime learning of decision trees", Journal of Machine Learning Research 8, pp. 891-933.

(Continued)

*Primary Examiner* — Michael J Huntley
*Assistant Examiner* — Imad Kassim

(57) ABSTRACT

A method, a system, and a system of systems, that couples one or more non-interpretable systems to one or more interpretable systems by using the output results of the non-interpretable systems as the training targets for the interpretable systems. The method, the system, and the system of systems provide for non-interpretable complex nonlinear interactions among inputs by augmenting the set of in-sample and out-sample inputs. The result of the coupling is one or more resulting interpretable systems that allow for the development of explanations, justifications, and rationalizations for systems heretofore non-explainable or non-interpretable. The method, system and system of systems solve transparency and bias problems for non-interpretable systems and provides a basis for ethical systems, such as ethical artificial intelligent (AI) systems.

12 Claims, 5 Drawing Sheets

(56) References Cited

OTHER PUBLICATIONS

Freedman, R. S. (2019), "Visual Backpropagation", arXiv preprint arXiv:1906.04011, pp. 1-43.

Freedman, R. S. (2019), "Copula Representations and Error Surface Projections for the Exclusive or Problem", arXiv preprint arXiv:1907.04483. pp. 1-41.

Quinlan, J. R. (1993), "Combining instance-based and system-based learning", Proceedings of the Tenth International Conference on Machine Learning, pp. 236-243.

Diederich, J., and Barakat, N. (Dec. 2004), "Hybrid rule-extraction from support vector machines", IEEE Conference on Cybernetics and Intelligent Systems, vol. 2, pp. 1271-1276.

Andrews, R., Diederich J. and Tickle, A., (Jan. 1995), "Survey and critique of techniques for extracting rules from trained artificial neural networks", Knowledge-based systems, vol. 6 (6), pp. 373-389.

Ribeiro, M. T., Singh, S., & Guestrin, C. (Aug. 9, 2016), "Why should I trust you? Explaining the predictions of any classifier", Proceedings of the 22nd ACM SIGKDD International Conference on Knowledge Discovery and Data Mining, pp. 1135-1144.

Freedman, R.S. and Soskowski, I. (Dec. 2012), "A System of Systems Framework for Health and Human Services", pp. 1-10, Available at SSRN: https://ssrn.com/abstract=2512276 or http://dx.dol.org/10.2139/ssrn.2512276.

Freedman, R.S. (Oct. 2014), "Understanding the Complexity of Financial Systems of Systems", NYU Tandon Research Paper No. 2512307, pp. 1-18, Available at SSRN: https://ssrn.com/abstract=2512307 or http://dx.doi.org/10.2139/ssrn.2512307.

Freedman, R.S. and Soskowski, I. (Jul. 2010), "Surveillance of Parimutual Wagering Integrity Using Expert Systems and Machine Learning", Proceedings of the 2010 Conference on Innovative Applications of Artificial Intelligence, AAAI, pp. 1732-1738.

Nesbit, D., "Removing harmful language from my lexicon", Blog, Jun. 7, 2020, available at: https://www.duncannlsbet.co.uk/removing-harmful-language-from-my-lexicon.

Wan, A., Dunlap, L, Ho, D., Yin J., Lee, S., Jin, H., Petryk, S., Bargai., S.A. and Gonzalez, J.E. (Jan. 28, 2021), "NBDT: Neural-Backed Decision Trees" arXiv preprint arXiv:2004.00221, pp. 1-18.

* cited by examiner

Fig. 7

PROVIDING THE BASIS FOR ETHICAL AI THROUGH EXPLANATIONS BY COUPLING NON-INTERPRETABLE AND INTERPRETABLE SYSTEMS

FIELD OF INVENTION

The present invention relates to a method, a system, and a system of systems that couples one or more non-interpretable systems, such as a system based on a deep learning neural network, to one or more interpretable systems, such as a system based on a decision tree or on linear regression, thereby providing one or more resultant interpretable, transparent systems and system of systems, and thus forming the basis of an ethical system and ethical system of systems, such as an ethical AI system.

BACKGROUND

A system of systems is a collection of component systems that work together to create a bigger and more complex system. A system of systems provides more functionality than the sum of its component system functionalities. Examples include collections of systems based on deep learning neural network systems and/or systems based on decision tree systems or linear regression systems. Systems and systems of systems can reside on a circuit, a device, a chip, a computer, a laptop, a smartphone, a personal digital assistant (PDA), a network, an Internet of Things (IoT) device, in a Cloud, or other computational or informatic devices or environments.

Decision systems and artificial intelligence (AI) systems utilize mathematical models (typically utilizing certain model parameters, weights, or coefficients) with a decision algorithm. A machine learning (ML) system, other learning systems, a training system, or a regression system infers these model parameters, weights, or coefficients from previous observed data and the corresponding decision results. Given a situation, or environmental context, described by model input variables, the decision algorithm outputs a choice or a numerical result. Example applications include, among others, classification (e.g., determining which output category a given input belongs) and prediction (e.g., extrapolating a functional relationship between input and output). Other terms for inputs include features, attributes, predictors, covariates, independent variables, etc.; other terms for outputs include outcomes, targets, dependent variables, etc.

For many decision systems, one can understand and rationalize the output of the system. For example, in models where the input variables form a linear weighted score, one can assess the significance and relevance of each variable by looking at the magnitudes of the weights. Interpretable systems are decision systems that have the property wherein the outputs have explanations and justifications that a person or machine can understand. On the other hand, many systems are not interpretable having the property wherein the outputs do not have understandable explanations and justifications. Examples of non-interpretable systems are those that rely on non-linear scores that model complex nonlinear interactions among inputs. Such non-interpretable systems include neural network systems, wherein it is not clear what the weights mean and how the inputs and weights combine to derive an explainable output.

ML systems, other learning systems, training systems, and regression systems, collectively referred to herein as learning systems, depend on mathematical models and produce results based on samples of data. Once the model and data are configured and implemented, these systems can iteratively improve their performance without additional programming.

Each data sample, also known as a training case, consists of a set of values that corresponds to a classification or prediction. For example, an automobile's attributes of mass, size, color, and cost correspond to a miles-per-gallon classification, such as "high", "medium", "low", or a numerical prediction for miles per gallon (MPG), such as "33.5".

Typically input data are partitioned into "in-sample" data (data, classifications or predictions used for training the learning system) and "out-sample" data (data, classifications or predictions not used for training but are used to assess learning performance on unseen data). It is important to assess how well the decision system will perform in practice. Cross-validation refers to the validation process that assesses how well the results of in-sample learning generalizes to independent out-sample data. When learning system results are acceptable then the corresponding decision system is a candidate for deployment.

FIG. 1 shows a schematic of a learning procedure used in a learning system. For in-sample learning, the model (initially generated with pre-set parameters, sometimes called model weights) processes the inputs and generates outputs. These outputs are compared with the known in-sample outputs (sometimes called targets or target data). The comparison is performed by the learning system procedure which computes an in-sample error, which is a function between the output and the target. If the error is within a pre-defined tolerance, then the in-sample learning halts and these "optimized" learning system weights are saved (i.e, the weights are optimized in the sense that the errors are minimized). Otherwise, the learning system procedure continues using the current model weights as the starting point for new weight adjustments. Again, the learning system computes new outputs and errors and the procedure repeats. The learning system usually tracks the model weights with the smallest errors. If the error is never less than the pre-defined tolerance, then the entire procedure is restarted. This could involve choosing a different set of pre-set initial model weights, error tolerances, or choosing a different model altogether.

For out-sample cross-validation, the "optimized" model (using the optimized weights generated from in-sample learning) processes the out-sample data as inputs that were never used for learning or training. The corresponding model outputs are compared with the known out-sample target outputs and the learning system computes an out-sample error. If this error is within a pre-defined tolerance, then the out-sample learning procedure halts and the model weights are validated and saved; that is, the model and model weights are acceptable. Otherwise, we go back and repeat the in-sample learning, possibly using the current model weights as the starting point for new weight adjustments to find a new set of optimized weights which are either acceptable or not.

Examples of learning algorithms include ID3 (the "Iterative Dichotomiser" version 3) for building decision tree models and "back propagation" for building artificial neural network models. Prior art discusses several algorithms used in learning systems, such as: Fisher, D. H., & McKusick, K. B. (1989), "An empirical comparison of ID3 and backpropagation" IJCAI, pp. 788-793; Freedman, R. S., Frail, R. P., Schneider, F. T., & Schnitta, B. (1991). "Expert systems in spreadsheets: Modeling the wall street user domain". In Proceedings First International Conference on Artificial Intelligence Applications on Wall Street (pp. 296-301). IEEE Computer Society; Breslow, L. A., & Aha, D. W. (1997), "Simplifying decision trees: A survey", Knowledge Engineering Review, 12(1), pp. 1-40; Esmeir, S., & Markovitch, S. (2007), "Anytime learning of decision trees", Journal of Machine Learning Research 8, pp. 891-933; Hastie, T., R. Tibshirani, and J. Friedman (2011) "The Elements of Statistical Learning", Data Mining, Inference, and Prediction. 2nd ed. New York: Springer; Rangaswamy, C. K. (2015), "A Comparative Analysis on ID3 and Backpropagation Algorithms", International Journal of Advanced Research in Computer Science, 6(5).

For example, the output of an ID3 learning system is a computer representation of a tree-like data structure. When a decision system uses this tree, the decision system classifies new test cases by traversing the ID3-generated tree from a root down a decision path, using the inputs of the data to arrive at a final leaf node. For in-sample data, the decision computed from the tree by the decision system should correspond to the actual in-sample classification. The learning system is acceptable if the decision computed from the tree by the decision system on the out-sample data also corresponds to known classifications.

As another example, binary decision trees can represent any logical formula developed in terms of "disjunctive normal form", i.e., a disjunctive set of conjunctions. FIG. 2 shows a decision tree for two inputs, x1 and x2, that have values that are either TRUE or FALSE (or are formulas that evaluate to TRUE or FALSE). For example, a rule that specifies "exclusive or" is "output y is TRUE IF input x1 is TRUE OR input x2 is TRUE but x1 AND x2 are not both TRUE at the same time." The "exclusive or" corresponds to two paths: the first path is (starting from x1) right to left (x1 AND NOT x2) and the second path is left to right (NOT x1 AND x2). A learning system can represent these rules in several ways, for example, for output y:

1. y=TRUE IF (x1 AND NOT x2) OR (NOT x1 AND x2) ELSE y=FALSE.
2. y=TRUE IF (x1 OR x2) AND (NOT x1 OR NOT x2) ELSE y=FALSE.
3. y=TRUE IF (x1 OR x2) AND NOT (x1 AND x2) ELSE y=FALSE.

There are 16 potential path combinations on this tree, corresponding to all 16 logical formulas for two inputs.

Techniques exist that translate decision trees to a set of logical rules written in a simple textual format. Thus, text base rules are interpretable by machines or persons, such as legal, regulatory, quality assurance staff, etc. That is, tree-based decision systems are interpretable wherein decisions are explainable by people or machines.

Another example of an interpretable system is a learning system based on linear regression, wherein the inputs range over a subset of real numbers. The outputs are a linear combination of the inputs. A feature of linear regression is that the magnitude of weights provides interpretations of significance and relevance of the corresponding individual input to the final outputs. Since a linear function of normally distributed independent random variables is also normally distributed, the assumption of independent normally distributed errors (defined for regression typically as a squared difference between computed system outputs and target outputs) provides a statistical interpretation of the magnitude of the weights.

For non-normally distributed errors, statisticians have recommended the use of certain nonlinear invertible transformations on the input or output data. These include the family of power transformations (such as the Box-Cox transformation) or softmax transformation. Other unitary transformations on the data (such as logarithmic, exponential, or simple reciprocal or division) have also been used. After the data transformations, the new regression represents the transformed outputs as a linear combination of the transformed inputs.

Other regression models include time-shifted values of the outputs as input variables. These models are useful for prediction of time-series. Such models are termed autoregressive. Other models represent the model error terms as a linear regression; this gives rise to moving average models. When used with differences (or logarithmic quotients) of inputs, these regression models are termed autoregressive integrated moving average (ARIMA) models.

For all cases, linear regression learning systems result in decision systems that are interpretable and explainable.

Another example of an interpretable system is a linear discriminant system which is used in some decision systems based on trees and some decision systems based on regression. Linear discriminants are also called perceptrons. For example, for two inputs $x_1$, $x_2$ the regression formula providing a linear functional relationship between inputs and outputs is:

$$\text{out}(x_1, x_2) = w_1 \cdot x_1 + w_2 \cdot x_2 + w_3$$

wherein the weights $w_1$, $w_2$, and $w_3$ are outputs of a learning system based on linear regression.

If the value of $w_1$ is large with respect to $w_2$ then the input $x_1$ can be interpreted as more significant than input $x_2$. The linear regression weights minimize the errors (defined as a squared difference between computed system outputs and actual target outputs). An example of a linear discriminant is:

$$\text{IF out}(x_1, x_2) > 0.5 \text{ THEN } y=1 \text{ ELSE } y=0$$

Using the Heaviside step function u(t), defined as:

$$u(t) = \begin{cases} 1, & t \geq 0 \\ 0, & t < 0 \end{cases}$$

then, the value y can be represented as:

$$y = u(w_1 \cdot x_1 + w_2 \cdot x_2 + w_3 - 0.5)$$

The regression learning system computes the three weights $w_1$, $w_2$, $w_3$ from the input and target data. It finds the "optimal" weights that minimize an error. For example, the rule $$y = x_1 \text{ OR } x_2$$

can be expressed exactly as the linear discriminant:

$$\text{IF } 0.5 \cdot x_1 + 0.5 \cdot x_2 + 0.25 > 0.5 \text{ THEN } y=1 \text{ ELSE } y=0.$$

Here, the number 0 corresponds to FALSE and 1 corresponds to TRUE. The linear discriminant is exact, in other words the error is zero for $x_1$ and $x_2$ having values that are either 0 or 1.

Linear discriminants cannot exactly represent all logical formulas. For example, for the "exclusive or" problem discussed above, the optimal linear regression weights are $w_3 = 0.5$ and $w_1 = w_2 = 0$. In this case, an exact linear discriminant does not exist. However, exact nonlinear discriminants do exist. Three examples of nonlinear functions (exact for $x_1$ and $x_2$ having values that are either 0 or 1) for the "exclusive or" problem for output y are:

$$y=\max(x_1,x_2)-\min(x_1,x_2) \qquad 1.$$

$$y=\min((x_1+x_2),1)-\max((x_1+x_2-1),0) \qquad 2.$$

$$y=(x_1+x_2)-(2\cdot(x_1\cdot x_2)) \qquad 3.$$

These formulas are special cases of the following linear formula:

$$y=w_1\cdot f_1(x_1,x_2)+w_2\cdot f_2(x_1,x_2)+w_3$$

This formula is interpretable. For example, if the function values $f_1(x_1, x_2)$ and $f_2(x_1, x_2)$ for the inputs are similarly scaled, then one interpretation of larger values of $w_1$ as compared to $w_2$ means that the non-linear combination of inputs indicated by function $x_2$) is more significant than the non-linear combination of inputs indicated by function $f_2(x_1, x_2)$. Linear regression methods can then be used to find the weights that minimize the errors. In general, this representation is called basis-function regression, or called polynomial regression when all functions are polynomials. Many of these representations, based on orthogonal functions, can be proved to theoretically converge to any bounded continuous function, with examples being Taylor series and Fourier series.

Pao (U.S. Pat. No. 4,979,126) calls components of this linear formula a "functional link." Pao represents the components as pre-computed inputs. For example, consider the linear regression expression:

$$\mathrm{out}(x_1,x_2,x_3)=w_1\cdot x_1+w_2\cdot x_2+w_3\cdot x_3+w_4$$

Instead of $x_3$ being a completely independent input, Pao suggests, for example, that input $x_3$ be pre-computed by:

$$x_3=x_1\cdot x_2$$

Thus, a regression for "exclusive or" would involve three inputs, not two inputs, with the third input being computed from the first two inputs. For example, tree-based learning and linear discriminant learning with the functional link represented as input $x_3=x_1\cdot x_2$ can learn the "exclusive or" rule.

Many other learning systems generalize linear regression. These systems find a set of weights, i.e., parameters in a nonlinear objective function, that minimize an error between observed targets and computed output values. Examples include support vector machine systems, case-based or evidence-based reasoning systems using weighted similarity scores, nearest-neighbor matching systems, genetic search systems, stochastic search systems, quadratic systems, curvilinear systems, basis function regression systems, kernel regression systems, and Kalman systems, etc. Similarly, many other learning systems, in addition to ID3, build decision trees. These include systems such as C4.5 systems, CART (Classification and Regression Tree) systems, etc.

Neural network systems generalize linear regression to nonlinear regression. For example, the output of a learning system based on back propagation is a set of numbers (called weights) which are parameters to a complex network of formulas called "neural network activation functions". As an example, for a simple 2-2-1 neural network topology (where 2-2-1 represents: 2 inputs, 2 intermediate "hidden" layer outputs, 1 system output), the nonlinear formula for output y is shown below:

$$y=f_2(w_{11}^2\cdot(f_1(w_{11}^1\cdot x_1+w_{12}^1\cdot x_2+w_{13}^1))+w_{12}^2\cdot(f_1(w_{21}^1\cdot x_1+w_{22}^1\cdot x_2+w_{23}^1))+w_{13}^2)$$

In this case, $x_1$ and $x_2$ are two inputs, y is the output wherein all inputs and outputs range over a finite interval, usually between 0 and 1 or between −1 and 1. FIG. 3 shows the neural network topology for this example.

Specific network weights, intermediate layer output values, and functional dependencies are shown in FIG. 3 as arrows. The layout of the weights and intermediate output values are shown below. The computations are:

For the two intermediate outputs, i.e., the "hidden" layer:

$$\mathrm{out\_11}=f_1(w_{11}^1\cdot x_1+w_{12}^2\cdot x_2+w_{13}^1)$$

$$\mathrm{out\_12}=f_1(w_{21}^1\cdot x_1+w_{22}^1\cdot x_2+w_{23}^1)$$

For the system output:

$$\mathrm{out}=f_2(w_{11}^2\cdot\mathrm{out\_11}+w_{12}^2\cdot\mathrm{out\_12}+w_{13}^2)$$

$$=f_2(w_{11}^2\cdot(f_1(w_{11}^1\cdot x_1+w_{12}^1\cdot x_2+w_{13}^1))+w_{12}^2\cdot(f_1(w_{21}^1\cdot x_1+w_{22}^1\cdot x_2+w_{23}^1))+w_{13}^2)$$

The weights that the learning system finds are the nine parameters $w_{11}^1$, $w_{12}^1$, $w_{13}^1$, $w_{21}^1$, $w_{22}^1$, $w_{23}^1$, $w_{11}^2$, $w_{12}^2$, $w_{13}^2$; these nine weights are non-interpretable.

The neural network activation functions, $f_1$ and $f_2$, return real numbers and are defined over the same finite interval as the inputs and outputs.

Examples of popular activation functions include the hyperbolic tangent:

$$f(t)=\tanh(t)$$

and the rectified linear unit ("RELU"):

$$f(t)=t\cdot u(t)=\begin{cases}t, t\geq 0\\ 0, t<0\end{cases}$$

wherein u(t) is the Heaviside step function defined above.

When a decision system uses these learning system-generated weights, the decision system classifies new test cases by evaluating a nonlinear network of activation functions. For in-sample data, the decision computed from the nonlinear network of functions by the decision system corresponds to the actual in-sample classification. The final result of the learning system, i.e., the weights, are acceptable if the decision computed from the nonlinear network of functions by the decision system on the out-sample data also corresponds to the known classification.

Neural network learning systems result in decision systems that are not interpretable or explainable. The interpretation problem becomes more complex for networks having more than two or three inputs or more than one hidden layer. For example, FIG. 4 shows a portion of a 9-50-30-1 neural network with two hidden layers (9 inputs, 50 intermediate outputs for "hidden layer 1", 30 intermediate outputs for "hidden layer 2", 1 system output). FIG. 5 shows the absolute magnitudes, represented in different shades, of a portion of the 2,061 weights of FIG. 4. There is no way to interpret the 2,061 weights of this neural network.

In addition, since the training data is discarded in the deployed decision systems based on neural networks, interpretation of results is especially difficult.

Most contemporary research is concerned with demonstrating the superiority of one decision system over another. For example, factors that are considered include learning speed, out-sample accuracy, and operational performance. Many researchers use standard data sets archived in the UCI Machine Learning Repository (Dua & Graff 2019) to help in their evaluations. For example, in terms of operational performance and accuracy, data scientists believe that neural network models are superior; however, in terms of interpretability, neural networks are the least interpretable.

Prior work regarding the explanation of neural network systems attempt to apply linear techniques by investigating the statistical correlations of the neural network weights on input data. Usually, this analysis is performed on the training data that is used to develop the non-interpretable system for in-sample training or for out-sample cross-validation, We denote such utilization using in-sample or out-sample data "development mode." Conversely, we denote any utilization using randomly selected data, or any data that was not used to develop the non-interpretable system, both for in-sample training and out-sample validation, "forensic mode".

Other prior art provide techniques for improving the relevance of the input training data in order to improve neural network performance. For example, the method in US Patent Application 2020/0074331 identifies a subset of the training data that has "less relevance" to the output compared with a second subset of the training data; the second subset of the training data provides "evidence that explain" the output. However, '331 is similar to other methods that use a single non-interpretable system, variance of input data, and the manipulation of internal weights and internal node selection. Additionally, '331 fails to provide interpretability of non-interpretable systems. Using data with "less relevance" in a single non-interpretable system does not rely upon the coupling of interpretable systems to interpret non-interpretable systems, in the case of '331, a neural network.

Other proposed learning systems known in the art are hybrid systems, i.e., systems where sets of non-interpretable systems, interpretable systems, or a mixture of non-interpretable and interpretable systems work together to create a hybrid architecture of systems of learning systems that claim improved output performance measured by reduced errors. For example, the learning system proposed by Wan et al (Wan, A., Dunlap, L., Ho, D., Yin, J., Lee, S., Jin, H., Petryk, S., Bargal, S. A. and Gonzalez, J. E. (2020). NBDT: Neural-Backed Decision Trees. arXiv preprint arXiv:2004.00221) proposes a system that is "substantially . . . more accurate than state-of-the-art hybrid decision tree and deep learning-based approaches on standard benchmarks." Wan et al improves output performance measured by reduced errors; but (i) does not couple an arbitrary non-interpretable system to an arbitrary interpretable system; (ii) does not use the outputs of the non-interpretable systems as training targets to the interpretable systems; (iii) does not couple interpretable to non-interpretable systems in development or forensic modes, but only constructs hybrid architectures in development mode; (iv) is limited to a specific interpretable system, i.e. decision trees.

Explaining the results of systems is one aspect of assuring the ethical use of technology. Non-interpretable systems might have hidden biases wherein there is no accountability as the results cannot be formally justified. This lack of transparency, informally referred to as a "black box" system, which term itself seems biased, can lead to accusations of unfairness, threats to human dignity, and litigation.

The well-known adage, "If you can't measure it, you can't manage it" can be adopted to ethical systems. In our opinion, we say:

"If you can't explain it, you can't determine whether it is ethical or not."

Disputes, arguments, and litigation concerning black-box systems are concerned with their transparency.

For non-interpretable systems, even the disclosure of proprietary algorithms and programming implementations, e.g., program source code, is insufficient to explain or justify why the system does what it does if the implementation relies on non-interpretable weights or parameters. Alleged biases and misdeeds might be, at best, mitigated indirectly with time consuming and detailed forensic audits.

There is a need for a method and system that can interpret uninterpretable systems. The present invention solves this problem through the coupling of non-interpretable systems with interpretable systems.

SUMMARY OF THE INVENTION

The present invention is concerned with the coupling of non-interpretable and interpretable systems to provide for the basis of explanations, justifications, and rationalizations for systems heretofore non-explainable or non-interpretable. Explanations are useful as they provide trust and ethical mechanisms for systems. Interpretable systems are transparent (i.e., "white-box") while non-interpretable systems are non-transparent (i.e., "black-box"). This invention couples non-interpretable systems to interpretable systems by using the output results of the non-interpretable systems as the training targets for the interpretable systems. The invention accounts for non-interpretable complex nonlinear interactions among inputs by augmenting the set of in-sample and out-sample data by a set of nonlinear transformations. The method, system, or system of systems couples the non-interpretable systems to the interpretable systems and, when necessary, is iterative and improves over time. The resultant coupled interpretable system approximates the same outputs as the non-interpretable system when the difference between both system outputs, or a function of the difference between outputs, is less than an acceptable tolerance value. Consequently, the derived explanation of the interpretable system is the explanation for the non-interpretable system. This invention resolves ethical problems arising in black-box systems such as, for example, in artificial intelligence (AI) and in machine learning (ML) systems.

The non-interpretable systems, the interpretable systems, and the resulting coupled systems operate on a circuit, a chip, a device, a computer, a laptop, a smartphone, a personal digital assistant (PDA), a network, an Internet of Things (IoT) device, in a Cloud, or other computational or informatic devices or environments.

In one embodiment, the invention provides for a method of developing one or more coupled systems comprising providing one or more data sets, wherein the one or more data sets comprise at least one in-sample data sets and zero or more out-sample data sets; providing one or more non-interpretable systems that process the one or more data sets to produce one or more non-interpretable outputs; providing one or more interpretable systems that process the one or more data sets to produce one or more interpretable outputs; providing one or more comparing systems that compare the interpretable outputs with the non-interpretable outputs to produce a metric; using the metric to couple the one or more interpretable systems to the one or more non-interpretable systems, forming a coupled system; wherein the method is performed by execution of computer readable program code by said systems; and wherein the said systems comprise non-volatile processing circuitry.

The method provides for the non-interpretable systems and the interpretable systems to use the same data sets.

The method provides that the one or more non-interpretable systems is selected from the group comprising neural network systems, deep learning systems, convolutional neural network systems, recurrent neural network systems, non-interpretable support vector machine systems, artificial genetic systems, non-linear regression systems, non-parametric regression systems, kernel regression systems, other extant non-interpretable systems, and any other non-interpretable systems as yet to be developed and unknown in the art.

The method provides that the one or more interpretable systems is selected from the group comprising decision tree systems, interpretable support vector machine systems, regression systems, linear regression systems, curvilinear regression systems, polynomial regression systems, basis function regression systems, logistical regression systems, delta rule systems (also known as iterative regression systems), perceptron systems (also known as iterative linear discriminant systems), interpretable explainable systems, interpretable ethical systems, interpretable fairness systems, interpretable accountable systems, interpretable transparent systems, interpretable probabilistic systems, other interpretable systems, other extant interpretable systems, and any other interpretable systems as yet to be developed and unknown in the art.

The method provides that said metric is an error value.

The method provides that if the error value is below a specified tolerance, the coupled interpretable system is accepted and the comparing systems halt.

The method provides that if the error value is equal to or above a specified tolerance, the comparing systems iterate and adapt by an augmentation of the data sets to produce one or more coupled interpretable systems until the error value is below a specified tolerance, and the coupled interpretable systems are accepted and the comparing systems halt.

The method provides that the augmentation of the data sets comprises functional links.

The method provides coupling in a development mode, wherein the invention uses the original training data that was used to develop the non-interpretable system, both for in-sample training and out-sample validation.

The method provides coupling in a forensic mode, wherein the invention uses training data that was not used to develop the non-interpretable system, both for in-sample training and out-sample validation.

In another embodiment, the invention provides for one or more systems that comprises the same steps as the said method.

In another embodiment, the invention provides for one or more systems of systems that comprises the same steps as the said method.

In another embodiment, the invention comprises, consists, or consists essentially of the steps of the said method.

In another embodiment, the invention comprises, consists, or consists essentially of the steps and components of the said one or more systems.

In another embodiment, the invention comprises, consists, or consists essentially of the steps, components, and component systems of the said one or more system of systems.

BRIEF DESCRIPTION OF THE DRAWINGS

FIG. 7. shows a non-interpretable neural network system having 1-3-1 topology using the tanh activation function for all layers.

DETAILED DESCRIPTION OF THE INVENTION

Figure 1:
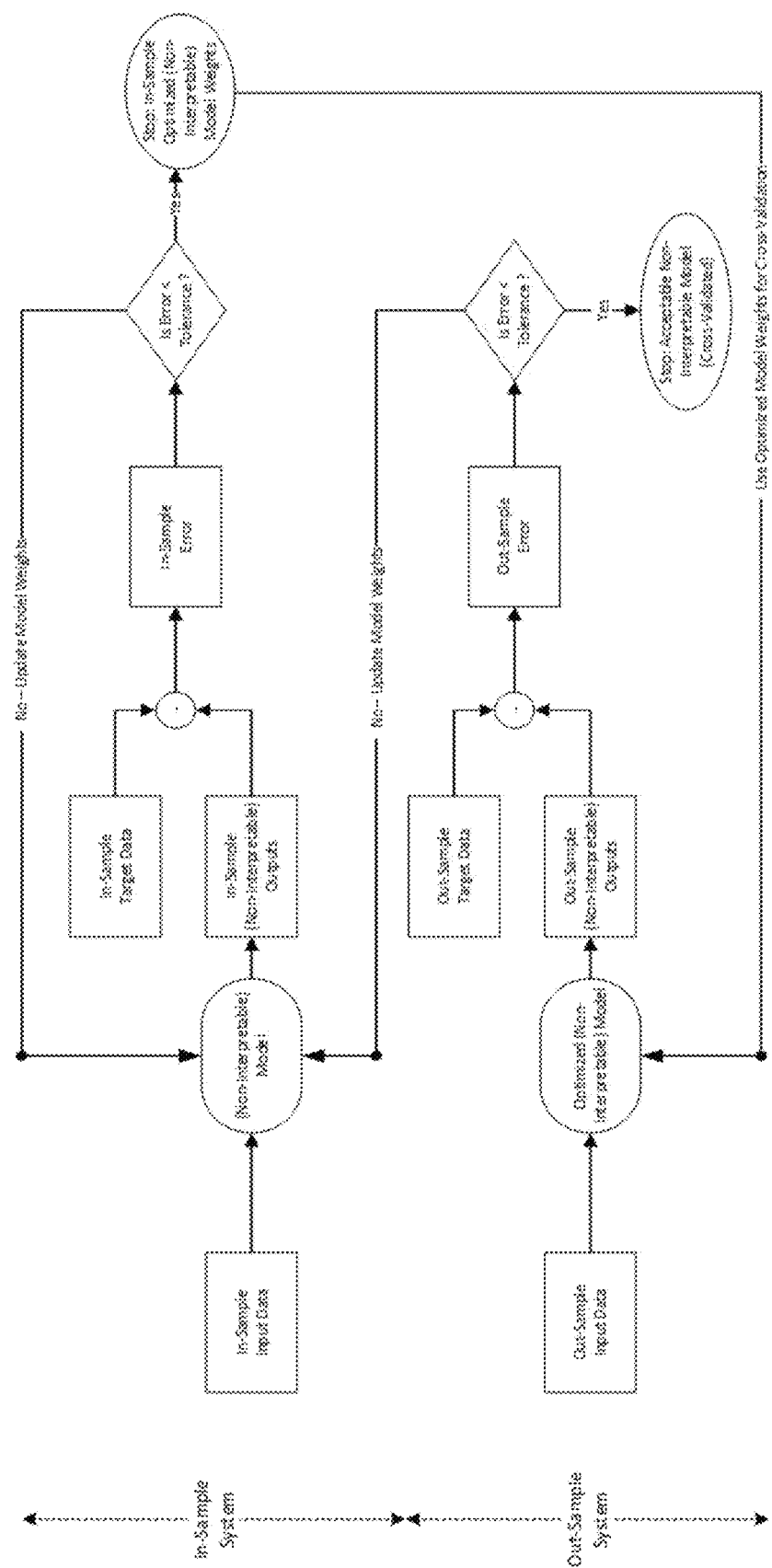
FIG. 1, known in the art, shows a flowchart specifying in-sample learning (which results in "optimized" model weights) and out-sample cross-validation (which results in "acceptable" model weights which can be used in a decision system).

This invention couples non-interpretable systems to interpretable systems by using the output results of the non-interpretable systems as the training targets for the interpretable systems. The invention accounts for non-interpretable complex nonlinear interactions among inputs by augmenting the input data by a set of nonlinear transformations of the inputs, thereby creating functional links. The method that couples the non-interpretable systems to the interpretable systems is iterative and improves over time, when necessary. The resulting coupled systems are interpretable systems, or interpretable system of systems. The one or more non-interpretable systems, the one or more interpretable systems, and the one or more resulting coupled systems operate on a circuit, a chip, a device, a computer, a laptop, a smartphone, a personal digital assistant (PDA), a network, an Internet of Things (IoT) device, in a Cloud, or other computational or informatic devices or environments.

The invention provides a method, system, and system of systems that interprets non-interpretable systems by coupling non-interpretable systems with interpretable systems. In one embodiment, the present invention is a system of systems by the fact that it couples non-interpretable systems to interpretable systems by using the output results of the non-interpretable systems as the training targets for the interpretable systems.

This invention provides a basis for explaining the results of non-interpretable systems which in turn supports the ethical use of technology. Non-interpretable systems might have hidden biases wherein there is no accountability as the results cannot be formally justified. This lack of transparency leads to accusations of unfairness, threats to human dignity, and litigation.

This invention resolves the deficiency wherein for non-interpretable systems, even the disclosure of proprietary algorithms and programming implementations, e.g., program source code, is insufficient to explain or justify why the system does what it does if the implementation relies on non-interpretable weights or parameters. This invention provides methods, systems, and systems of systems that can be used to resolve alleged biases and misdeeds which otherwise previously could only, at best, be mitigated indirectly with time consuming and detailed forensic audits.

One of ordinary skill in the art knows that hybrid systems are sets of non-interpretable systems, interpretable systems, or a mixture of non-interpretable and interpretable systems that work together to create a hybrid architecture that claim improved output performance measured by reduced errors. This invention differs from hybrid systems in that: (i) the invention does not propose a new learning architecture; (ii) the invention couples a given non-interpretable system to an interpretable system by using the outputs of the non-interpretable systems as training targets to the interpretable systems; (iii) the goal of the resultant system of the invention is improved interpretability, as opposed to only an improved output performance measured by reduced errors in the hybrid system; (iv) the invention couples interpretable to non-interpretable systems in development or forensic modes, whereas hybrid architectures must be constructed in development mode; and (v) the invention is not limited to any other specific interpretable system.

Figure 6:
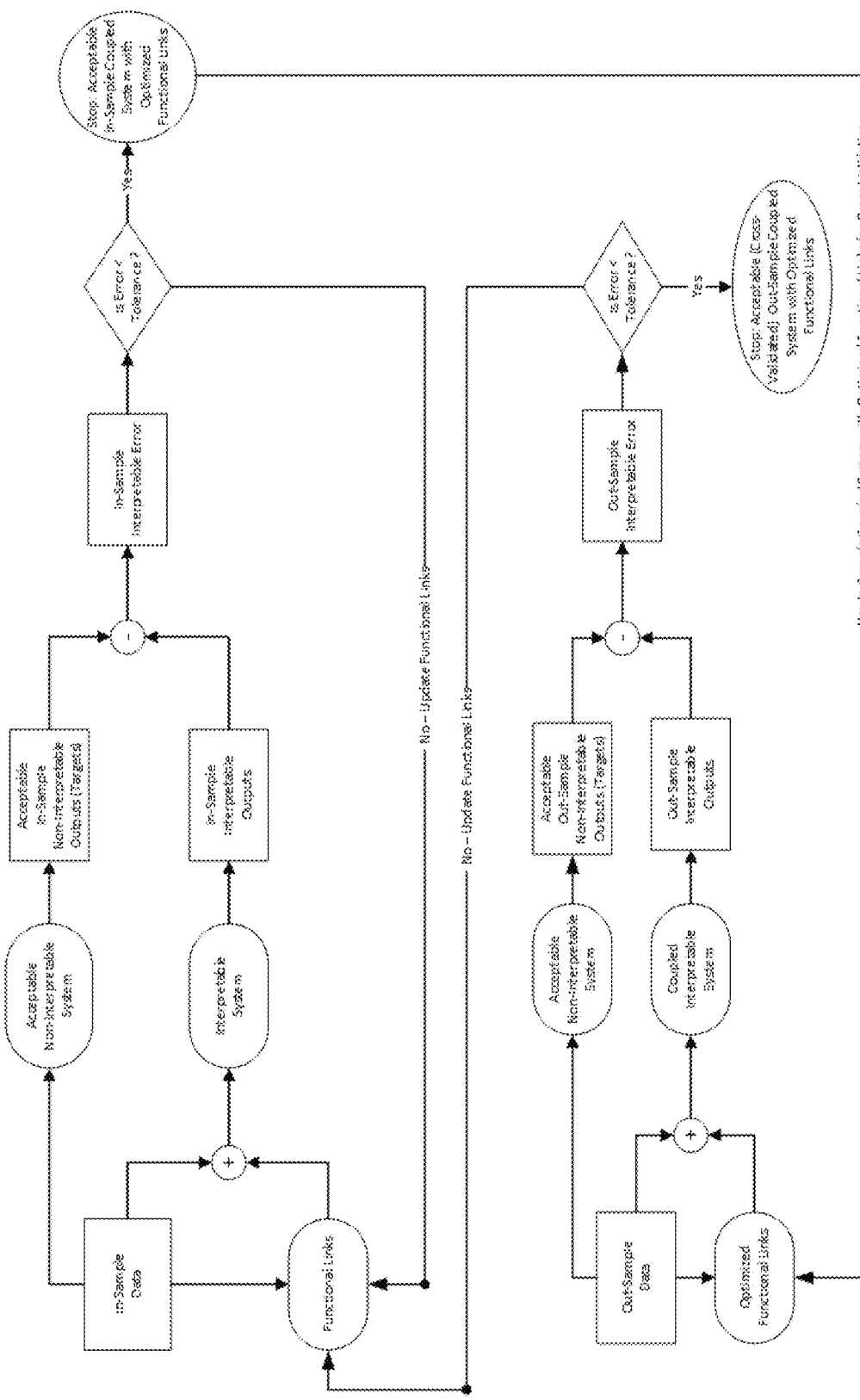
FIG. 6 shows an inventive flowchart specifying the inventive method that couples a non-interpretable system with an interpretable system based on functional links.

FIG. 6 provides a schematic that illustrates an embodiment of the invention. An acceptable non-interpretable system that generates acceptable outputs within an acceptable error is provided. An example of a non-interpretable system is a deep learning neural network system. An interpretable system is also provided. An example of an interpretable system is a linear regression system.

The invention first couples the one or more non-interpretable systems to the one or more interpretable systems using a set of specified data, i.e., the in-sample data set. The invention augments the in-sample input data with functional links, which are a set of additional data computed by nonlinear transformations of the input data for use by the interpretable systems.

The original in-sample input data are the inputs to the non-interpretable systems. The original in-sample input data augmented by the functional links are the inputs to the interpretable systems. Optimal weights and parameters for the interpretable systems are computed using these latter inputs. Next, the invention compares the outputs of the interpretable systems, using the optimal weights, with the outputs of the non-interpretable systems. If the error is less than a pre-defined tolerance, then the invention halts and saves this collection of functional links; otherwise, the invention iterates and updates the set of functional links.

In an update iteration, the original in-sample input data is augmented by an additional set of functional links. These new functional links, the previous set of functional links, and the original sample data are the inputs to the interpretable systems. Optimal weights and parameters for the interpretable systems are computed using these updated inputs. Next, the invention compares the outputs of these newly updated interpretable systems, using the optimal weights, with the outputs of the non-interpretable systems. If the error is less than a pre-defined tolerance, then the invention halts the instant iteration and saves this collection of functional links. This set of functional links are considered "optimized" for the in-sample data, i.e., the interpretable systems are coupled to the non-interpretable systems for the in-sample data. Otherwise, the invention continues iterating by updating the set of functional links, augmenting the in-sample input data, and generating new sets of optimal weights.

In one embodiment, cross-validation is performed in order to assess how well the coupling performs with data that has not been used by the previous procedure; this data is called out-sample data. The invention compares the outputs of the interpretable systems with the outputs of the non-interpretable systems using the out-sample data as input. Note that for the coupled interpretable systems, the out-sample inputs consist of the out-sample input data augmented by the "optimized" functional links. If the error is greater than a pre-defined tolerance, then the invention returns to the in-sample optimization, either using the previously "optimized" functional links as a starting point, or by generating a different set of functional links. If the error is less than a pre-defined tolerance, then the invention halts, i.e., the interpretable systems are coupled to the non-interpretable systems for the out-sample data, and the invention is confident that the explanations generated for the interpretable systems will be valid for the non-interpretable system.

In this invention, nonlinear transformations of the input data include multiplicative operations, trigonometric representations, and transformations based on orthogonal and special functions, such as Bessel, Legendre, Laguerre, Hermite, Chebyshev, Laplace, and others. Other nonlinear transformations include non-differentiable functions, such as combinations of the min, max, Heaviside functions, etc. Just as one can choose, for example, a specific neural network system topology, a person or machine using this invention can choose any set of nonlinear transformations for the functional links.

In one embodiment, this invention applies to systems with more than one output. Non-interpretable systems with more than one output are coupled using the above procedure to an interpretable system, output by output. The resulting set of coupled systems comprise a system of systems.

In one embodiment, this invention provides coupling in a development mode, wherein the invention uses the original training data that was used to develop the non-interpretable system, both for in-sample training and out-sample validation.

In another embodiment, this invention provides coupling in a forensic mode, wherein the invention uses training data that was not used to develop the non-interpretable system, both for in-sample training and out-sample validation.

Example I

Below is an example that illustrates an embodiment of the invention in forensic mode.

Figure 7:
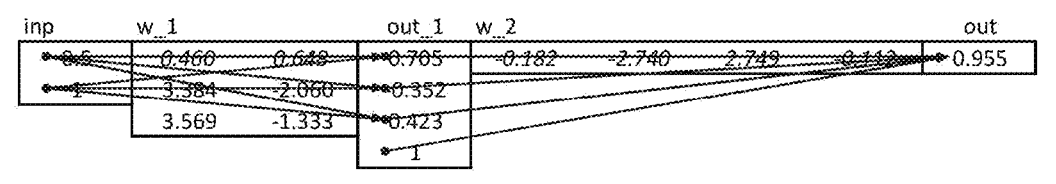

Consider the following non-interpretable neural network system having 1-3-1 topology (specifically, one input $x_1$, one hidden layer with three intermediate outputs, and one system output y) and using the tanh activation function for all layers. The acceptable weights are shown in FIG. 7.

This neural network system was trained to interpolate a set of data with inputs and target outputs that range between zero and one. The result of learning is the following non-interpretable representation for output y:

$$y = \tanh(2.749 \cdot \tanh(3.569 \cdot x_1 - 1.333) - 2.74 \cdot \tanh(3.384 \cdot x_1 - 2.06) - 0.182 \cdot \tanh(0.46 \cdot x_1 + 0.648) - 0.112)$$ 
Formula I Although this neural network was trained to an acceptable error tolerance, it is nonetheless non-interpretable, with no basis for an explanation to the meaning of the weights or how the weights relate to the final outputs.

In this example, the invention next couples an interpretable linear regression system to this non-interpretable neural network system. In this example, $\hat{y}$ denotes the output of the interpretable linear regression system. In this example, the coupling is chosen to have a maximum error tolerance, for example 0.03, based on the absolute error, i.e., the difference between non-interpretable and interpretable system outputs, defined as:

$$|y - \hat{y}| \leq 0.03$$

In this example, in forensic mode, in-sample input data is chosen to comprise of eleven equally spaced inputs for $x_1$, specifically, 0.0, 0.1, 0.2, . . . 1.0. Table I displays the in-sample output data computed from the in-sample input data by the non-interpretable system using the above neural network Formula I for y.

TABLE I

Example of forensic mode showing in-sample input data and in-sample output data for the non-interpretable system.

|  | $x_1$ | y |
| --- | --- | --- |
| Record 1 | 0 | 0.04 |
| Record 2 | 0.1 | 0.28 |
| Record 3 | 0.2 | 0.59 |
| Record 4 | 0.3 | 0.81 |
| Record 5 | 0.4 | 0.93 |
| Record 6 | 0.5 | 0.96 |
| Record 7 | 0.6 | 0.93 |
| Record 8 | 0.7 | 0.83 |
| Record 9 | 0.8 | 0.59 |
| Record 10 | 0.9 | 0.29 |
| Record 11 | 1 | 0.05 |

Initially, without any functional links, a linear regression system is represented by:

$$\hat{y} = w_1 \cdot x_1 + w_2$$

Standard regression learning computes the optimized weights for $w_1$ and $w_2$, wherein the resulting system is:

$$y = 0 \cdot x_1 + 0.57 \quad \text{Formula II.a}$$

The average absolute error over all outputs in the in-sample data for $|y-\hat{y}|$ is greater than 0.3. This is ten times the chosen error tolerance. To reduce the error, the invention augments the in-sample data with a functional link. A simple nonlinear transformation $x_1 \cdot x_1 = x_1^2$ is selected. The new interpretable system is:

$$\hat{y} = w_1 \cdot x_1 + w_2 \cdot x_2 + w_3$$

wherein $x_2 = x_1 \cdot x_1 = x_1^2$.

Standard regression learning computes the optimized weights for $w_1$, $w_2$, $w_3$. The resulting system is:

$$\hat{y} = 3.8 \cdot x_1 - 3.8 \cdot x_2 - 0.003$$

$$= 3.8 \cdot x_1 - 3.8 \cdot x_1^2 - 0.003 \quad \text{Formula II.b}$$

The results are shown in Table II.

TABLE II

In-sample data showing the original input ($x_1$), functional link ($x_2$), the outputs for the interpretable system ($\hat{y}$), and non-interpretable systems (y).

|  | $x_1$ | $x_2 = x_1^2$ | $\hat{y}$ | y |
| --- | --- | --- | --- | --- |
| Record 1 | 0 | 0 | 0.00 | 0.04 |
| Record 2 | 0.1 | 0.01 | 0.34 | 0.28 |
| Record 3 | 0.2 | 0.04 | 0.61 | 0.59 |
| Record 4 | 0.3 | 0.09 | 0.80 | 0.81 |
| Record 5 | 0.4 | 0.16 | 0.91 | 0.93 |
| Record 6 | 0.5 | 0.25 | 0.95 | 0.96 |
| Record 7 | 0.6 | 0.36 | 0.92 | 0.93 |
| Record 8 | 0.7 | 0.49 | 0.80 | 0.83 |
| Record 9 | 0.8 | 0.64 | 0.61 | 0.59 |
| Record 10 | 0.9 | 0.81 | 0.35 | 0.29 |
| Record 11 | 1 | 1 | 0.01 | 0.05 |

The average absolute error $|y-\hat{y}|$ for the resulting system is 0.029, which is within the specified error tolerance of 0.03. This functional link is considered "optimized" for the in-sample data and the invention halts, i.e., the interpretable system is coupled to the non-interpretable system for the in-sample data.

In a further embodiment of the invention, cross-validation is additionally performed to assess how well the coupling performs with out-sample data, i.e., data that has not heretofore been used. In this example, out-sample input data is chosen to be a set of two values, specifically, for example, 0.15 and 0.85. The invention compares the outputs of the interpretable systems with the outputs of the non-interpretable systems using the out-sample data as input. The results are shown in Table III.

TABLE III

Out-sample data showing the original input ($x_1$), functional link ($x_2$), the outputs for the interpretable system ($\hat{y}$), and non-interpretable systems (y).

|  | $x_1$ | $x_2 = x_1^2$ | $\hat{y}$ | y |
| --- | --- | --- | --- | --- |
| Record 12 | 0.15 | 0.0225 | 0.48 | 0.43 |
| Record 13 | 0.85 | 0.7225 | 0.49 | 0.44 |

The average absolute error $|y-\hat{y}|$ is greater than 0.05, which is greater than the Specified error tolerance of 0.03. The invention returns to the in-sample procedure and adds additional functional links. In this iteration, the invention adds the following three functional links to the existing functional links:

$$x_3 = = x_1^3$$

$$x_4 = x_1^4$$

$$x_5 = x_1^5$$

The new updated interpretable system is now:

$$\hat{y} = w_1 \cdot x_1 + w_2 \cdot x_2 + w_3 \cdot x_3 + w_4 \cdot x_4 + w_5 \cdot x_5 + w_6$$

Standard regression learning computes the optimized weights for $w_1$, $w_2$, $w_3$, $w_4$, $w_6$, $w_6$. The resulting system is:

$$\hat{y} = 2.7 \cdot x_1 + 1.5 \cdot x_1^2 - 7.6 \cdot x_1^3 + 2.7 \cdot x_1^4 + 0.8 \cdot x_1^5 + 0.03 \quad \text{Formula II.c}$$

The average absolute error $|y-\hat{y}|$ is 0.017, which is within the specified error tolerance of 0.03. The interpretable system is now coupled to the non-interpretable system for the in-sample data, and the in-sample procedure halts.

When the invention performs cross-validation with the same out-sample data using Formula I and Formula II.c, it is found that the average absolute error $|y-\hat{y}|$ is 0.012. This is within the specified error tolerance of 0.03. These functional links are considered "optimized" for the out-sample data, i.e., the interpretable system is coupled to the non-interpretable system for the out-sample data; the out-sample procedure halts; and the invention halts.

In the above example, a person or machine examining the magnitude of the interpretable weights using Formula II.c observes that, the largest, weight corresponds to the functional link $x_3 = x_1^3$. This functional link demonstrates a nonlinear relation between the inputs. The smallest weight is close to zero, which shows that the system does not depend on a constant. Since the interpretable system in this example is a linear regression system, a person or machine can provide more advanced statistical explanations if needed, such as, for example, t-statistics demonstrating significance and F-statistics for goodness of fit.

The invention, thus, provides a basis for explaining the results of non-interpretable systems which, in turn, supports the ethical use of technology. Non-interpretable systems might have hidden unethical biases wherein there is no accountability as the results cannot be formally justified.

Example II

Below is an example for the process of in-sample coupling using the present invention in development mode.

The in-sample data consists of the following four records, A, B, C, D:

| Records | x1 | x2 | target |
|---|---|---|---|
| A | 0 | 0 | 0 |
| B | 0 | 1 | 1 |
| C | 1 | 0 | 1 |
| D | 1 | 1 | 0 |

A system designer (person or machine) selects a deep learning decision system to create a function that maps the inputs to the target output. The system designer selects a neural network topology and trains it using backpropagation. The system designer selects the hyperbolic tangent for the activation function:

$$f_1(z) = f_2(z) = \tanh(z)$$

Backpropagation finds the set of nine weights that minimizes the following error, based on comparing neural network output to target output:

$$\text{error} := (\text{out}(0,0)-0)^2 + (\text{out}(0,1)-1)^2 + (\text{out}(1,0)-1)^2 + \text{out}(1,1)-0)^2$$

$$= (\tanh(w_{13}^2 - w_{11}^2 \cdot \tanh(w_{13}^1 l) + w_{12}^2 \cdot \tanh w_{23}^1)))^2$$

$$+ (\tanh(w_{13}^2 + w_{11}^2 \cdot \tanh(w_{11}^1 + w_{12}^1 + w_{13}^1) + w_{12}^2 \cdot \tanh(w_{21}^1 + w_{22}^1 + w_{23}^1))))^2$$

$$+ (\tanh(w_{13}^2 + w_{11}^2 \cdot f_1(w_{11}^1 + w_{13}^1) + w_{12}^2 \cdot \tanh(w_{21}^1 + w_{23}^1)) - 1)^2$$

$$+ (\tanh(w_{13}^2 + w_{11}^2 \cdot f_1(w_{12}^1 + w_{13}^1) + w_{12}^2 \cdot \tanh(w_{22}^1 + w_{23}^1)) - 1)^2$$

The final neural network has the form of a function that relates the inputs to output:

$$y = \text{out}(x_1, x_2) = \tanh(2.68 \cdot (\tanh(2.32 \cdot x_1 + 2.33 \cdot x_2 - 0.85)) - 2.7 \cdot (\tanh(1.74 \cdot x_1 + 1.75 \cdot x_2 - 2.65)) - 0.82)$$

The results of the backpropagation learning system above shows the weights that the system designer accepts. The in-sample output for this acceptable non-interpretable system are:

| Record | x1 | x2 | target | out | Errors |
|---|---|---|---|---|---|
| A | 0 | 0 | 0 | 6.88E−06 | 6.88E−06 |
| B | 0 | 1 | 1 | 0.998297 | 0.001703 |
| C | 1 | 0 | 1 | 0.998295 | 0.001705 |
| D | 1 | 1 | 0 | 1.25E−05 | 1.25E−05 |

The invention, in development mode, now couples this system to an interpretable system using the same in-sample data. The system designer decides that basis function regression is appropriate and sets a tolerance error threshold to $0.00001 = 10^{-5}$. Initially, without any functional links, the in-sample training set is:

| x1 | x2 | target |
|---|---|---|
| 0 | 0 | 0.000007 |
| 0 | 1 | 0.998 |
| 1 | 0 | 0.998 |
| 1 | 1 | 0.00001 |

Note that the target values are coupled to the output of the accepted non-interpretable neural network output. The initial interpretable system corresponds to simple linear regression:

$$\hat{y} = w_1 \cdot x_1 + w_2 \cdot x_2 + w_3$$

The results of regression find that the weights are $w_1 = 1.5 \cdot 10^{-6}$; $w_2 = 1.5 \cdot 10^{-6}$; $w_3 = 0.499$ and the output and errors are:

| x1 | x2 | target | out | error |
|---|---|---|---|---|
| 0 | 0 | 0.000007 | 0.4999 | −0.49989 |
| 0 | 1 | 0.998 | 0.499902 | 0.498099 |
| 1 | 0 | 0.998 | 0.499902 | 0.498099 |
| 1 | 1 | 0.00001 | 0.499903 | −0.49989 |

Note that the absolute errors are greater than the tolerance and, according to the invention, we therefore require functional links. The designer selects two functional links to augment the data set:

$$x_3 = x_2^2$$

$$x_4 = x_1 \cdot x_2$$

The interpretable system corresponds to:

$$\hat{y} = w_1 \cdot x_1 + w_2 \cdot x_2 + w_3 \cdot x_3 + w_4 \cdot x_4 + w_5$$

The results of regression show that the weights are (approximately):

$$w_1 = 0.998; w_2 = 0.998; w_3 = 0; w_4 = -1.996; w_5 = 7 \cdot 10^6$$

The output and errors are (rounded off):

| $x_1$ | $x_2$ | $x_3 = x_2^2$ | $x_4 = (x_1 * x_2)$ | target | out | error |
|---|---|---|---|---|---|---|
| 0 | 0 | 0 | 0 | 0.000007 | 0.000007 | 0 |
| 0 | 1 | 1 | 0 | 0.998 | 0.998007 | 7E−06 |
| 1 | 0 | 0 | 0 | 0.998 | 0.998007 | 7E−06 |
| 1 | 1 | 1 | 1 | 0.00001 | 0.000007 | −3E−06 |

The average absolute error is less than the tolerance, and the invention halts.

As a result, the system designer (person or machine) can now use this interpretable system as a basis to explain the non-interpretable neural network system.

With respect to the accepted error tolerance, the interpretable system:

$$\hat{y} = w_1 \cdot x_1 + w_2 \cdot x_2 + w_3 \cdot x_3 + w_4 \cdot x_4 + w_5$$

is now coupled to the non-interpretable system:

$$y = \tanh(w_{11}^2 \cdot (\tanh(w_{11}^1 \cdot x_1 + w_{12}^1 \cdot x_2 + w_{13}^1)) + w_{12}^2 \cdot (\tanh(w_{21}^1 \cdot x_1 + w_{22}^1 \cdot x_2 + w_{23}^1)) + w_{13}^2)$$

System designers examining the magnitude of the interpretable weights see that the largest weight corresponds to the functional link $x_4 = x_1 \cdot x_2$. This variable provides a nonlinear relation between the inputs. The smallest weights $w_3$ and $w_4$ are close to zero; this shows that the system does not depend on the nonlinear input relationship 4 or on a constant. Since the interpretable system is a linear regression system, the designers can also provide more advanced statistical explanations if needed (for example, t-statistics demonstrating significance and F-statistics for goodness of fit).

Example III

Consider the following non-interpretable nonlinear discriminant function for binary inputs $x_1$, $x_2$ (i.e., having values either 0 or 1) and binary output y specified with a neural network with two inputs, one output, and one hidden layer:

IF(tanh(2.68·(tanh(2.32·$x_1$+2.33·$x_2$−0.85))−2.7·(tanh (1.74·$x_1$+1.75·$x_2$−2.65))−0.82))>0.5

THEN y=1
ELSE y=0

Using this invention, this non-interpretable nonlinear discriminant function is coupled to an interpretable linear regression system with one functional link specified by, for example:

$x_3 = \min(x_1, x_2)$ which results in the coupled linear regression system:

$\hat{y} = x_1 + x_2 - 2 \cdot x_3$

This coupled linear regression formula for 9 suffices to match the nonlinear discriminant function y specified with the neural network, above, for all inputs. Moreover, the non-linear interaction of $x_1$ and $x_2$ may constitute an unethical bias revealed as $x_3$ because the absolute value of the weight of $x_3$ (i.e., a value of 2) is relatively high. The existence of a potential bias is explicitly revealed in interpretable systems, but the existence of potential bias is not explicitly revealed in non-interpretable systems.

Example IV

Consider the same nonlinear non-interpretable discriminant function of Example III for binary inputs $x_1$, $x_2$ (i.e., having values either 0 or 1) and binary output y specified with a neural network with two inputs, one output, and one hidden layer:

IF (tanh(2.68·(tanh(2.32·$x_1$+2.33·$x_2$−0.85))−2.7·(tanh (1.74·$x_1$+1.75·$x_2$−2.65))−0.82))>0.5

THEN y=1
ELSE y=0

Using this invention, this non-interpretable nonlinear discriminant function is coupled to an interpretable decision tree, wherein 1 is represented as TRUE and 0 is represented as FALSE.

A coupled decision tree output (i.e., rule) is:

$\hat{y} = x_1$ AND not $x_2$ OR $x_2$ AND not $x_1$

Using the functional link, another decision tree output (i.e., rule) is:

$\hat{y} =$ not $x_3$ AND $x_1$ OR not $x_3$ AND $x_2$ wherein $x_3 = x_1$ AND $x_2$.

Figure 2:
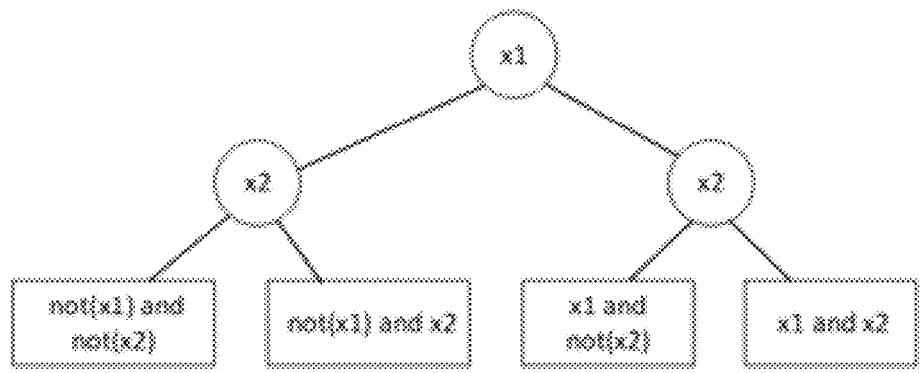
FIG. 2, known in the art, shows a schematic view of a decision tree; a path down the tree represents a conjunction; a set of paths represent disjunction.
Figure 3:
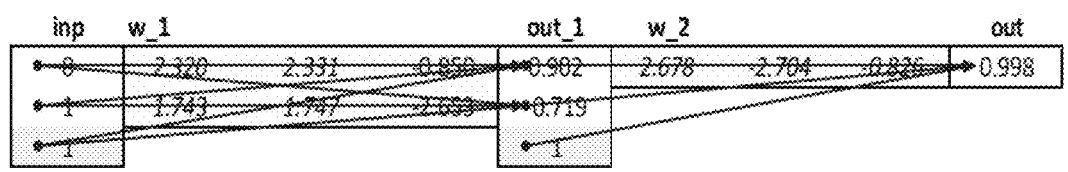
FIG. 3, known in the art, shows a representation of a 2-2-1 neural network having nine weights and one hidden layer. There is no easy way to interpret these weights.
Figure 3:
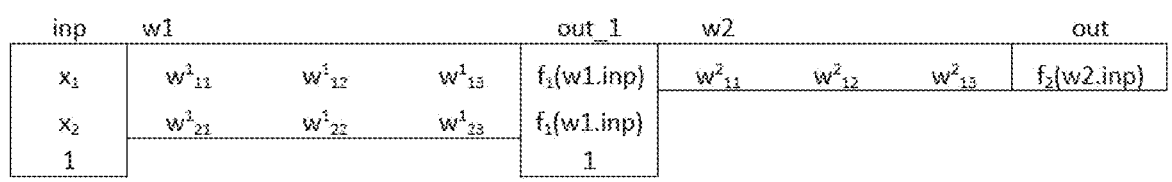
Figure 4:
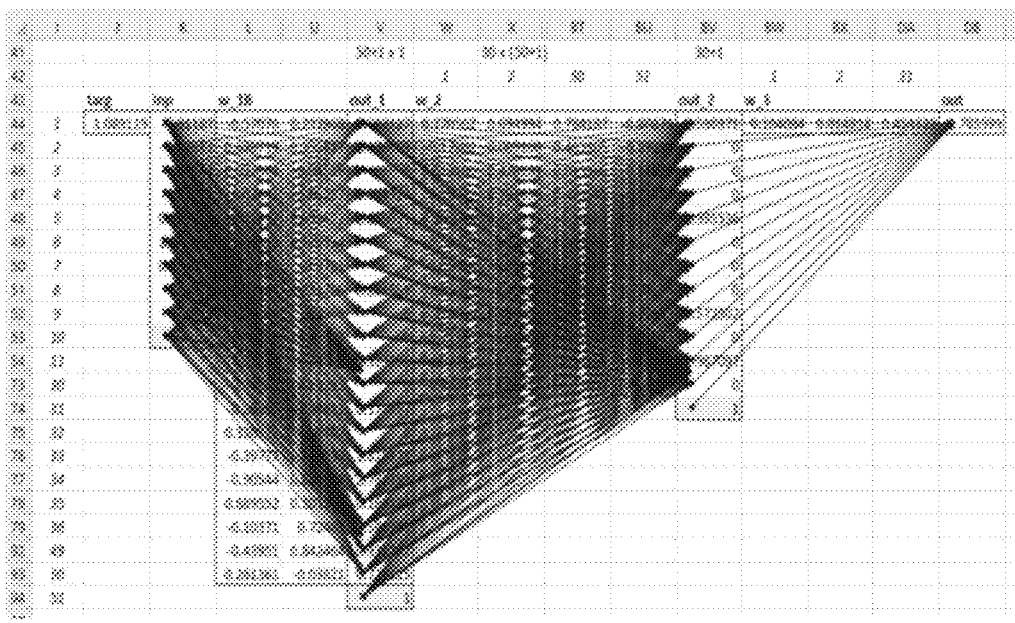
FIG. 4, known in the art, shows an example of a 9-50-30-1 neural network with two hidden layers. There is no easy way to interpret these weights.
Figure 5:
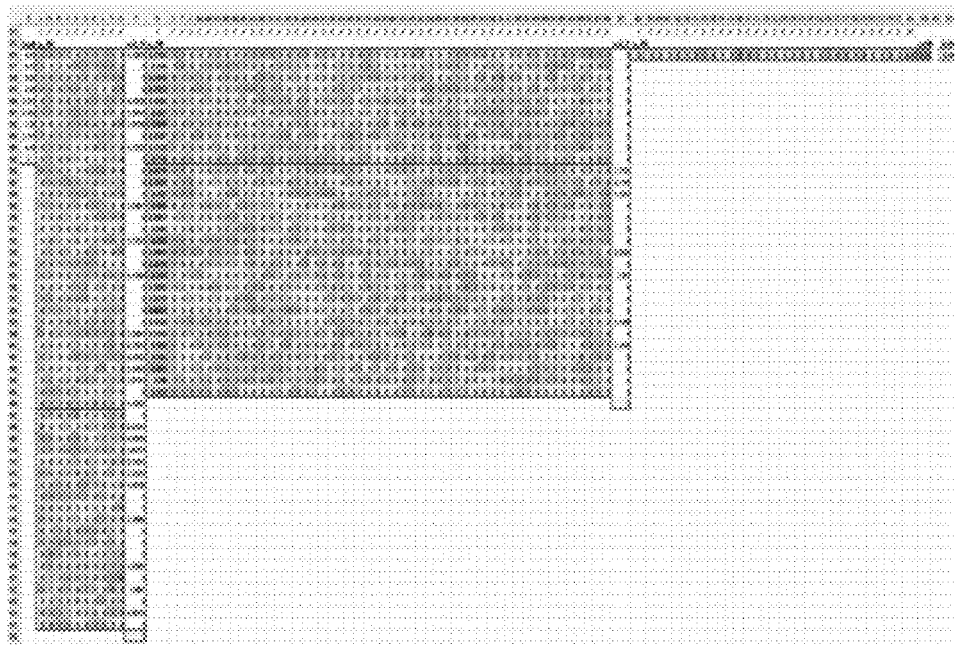
FIG. 5, known in the art, shows the absolute magnitudes of the weights in FIG. 4 formatted via "dark grey-medium grey-light grey" (respectively, "most negative-neutral-most positive") grey scales. There is no easy way to interpret these weights.

This path always traces down the left branch of a tree for $x_3$ (consistent with the interpretation of FIG. 2, the left side is the negative side of a decision tree) which shows the significance of $x_3$.

In general, in this invention, non-interpretable systems have n inputs and k outputs, wherein the n inputs are denoted by $x_1, x_2, \ldots, x_n$ and the k outputs are denoted by $y_1, y_2, \ldots, y_k$, and wherein the k outputs for the coupled interpretable systems are denoted by $\hat{y}_1, \hat{y}_2, \ldots, \hat{y}_k$. In one embodiment, non-interpretable systems with more than one output are coupled with the above procedure to an interpretable system output by output. That is, the resulting set of coupled systems comprise a system of systems.

Table IV provides a schematic record layout for in-sample data for the non-interpretable system, wherein s denotes the number of in-sample records.

TABLE IV

| In-Sample Data | in-sample inputs Data (n inputs) for non-interpretable system. development or forensic mode | | | in-sample outputs for $j^{th}$ non-interpretable system Computed from inputs: these outputs are used as targets for the coupled system |
|---|---|---|---|---|
| | $x_1$ | $x_2$ | ... $x_n$ | $y_j$ |
| Record 1 | $inp_{11}$ | $inp_{12}$ | ... $inp_{1n}$ | $targ_{1j}$ |
| 2 | $inp_{21}$ | $inp_{22}$ | ... $inp_{2n}$ | $targ_{2j}$ |
| . | . | . | ... . | . |
| . | . | . | . | . |
| . | . | . | . | . |
| s | $inp_{s1}$ | $inp_{s2}$ | ... $inp_{sn}$ | $targ_{sj}$ |

The initial state of the coupled interpretable system has no functional links. When functional links are added, the interpretable system's approximation to the non-interpretable system improves.

Table V provides a schematic record layout for in-sample data for an interpretable system having m functional links:

TABLE V

| In-Sample Data | in-sample inputs Data for coupled interpretable systems: n + m inputs (n original inputs augmented by m functional links) | | | | | in-sample outputs for $j^{th}$ interpretable system |
|---|---|---|---|---|---|---|
| | $x_1$ | ... $x_n$ | $x_{n+1} = f_1(x)$ | ... | $x_{n+m} = f_m(x)$ | $\hat{y}_j$ |
| Record 1 | $inp_{11}$ | ... $inp_{1n}$ | $f_1(inp_{11}, \ldots, inp_{1n})$ | ... | $f_m(inp_{11}, \ldots, inp_{1n})$ | $out_{1j}$ |
| 2 | $inp_{21}$ | ... $inp_{2n}$ | $f_1(inp_{21}, \ldots, inp_{2n})$ | ... | $f_m(inp_{21}, \ldots, inp_{2n})$ | $out_{2j}$ |
| . | . | ... . | ... | | ... | . |
| . | . | . | . | | | . |
| . | . | . | . | | | . |
| s | $inp_{s1}$ | ... $inp_{sn}$ | $f_1(inp_{s1}, \ldots, inp_{sn})$ | ... | $f_m(inp_{s1}, \ldots, inp_{sn})$ | $out_{sj}$ |

The invention compares the outputs between interpretable and non-interpretable systems.

Table VI provides a schematic record layout for in-sample data for the in-sample error comparisons.

TABLE VI

| In-Sample Data | in-sample error Coupling between outputs of non-interpretable and interpretable system | | |
|---|---|---|---|
| Record | $\hat{y}_1 - y_1$ | ... | $\hat{y}_k - y_k$ |
| 1 | $out_{11} - targ_{11}$ | ... | $out_{1k} - targ_{1k}$ |
| 2 | $out_{21} - targ_{21}$ | ... | $out_{2k} - targ_{2k}$ |
| . | . | ... | . |
| . | . | | . |
| . | . | | . |
| s | $out_{s1} - targ_{s1}$ | ... | $out_{sk} - targ_{sk}$ |

In-sample coupling between interpretable and non-interpretable systems is achieved and the current set of functional links is considered optimized when the difference between their corresponding outputs is less than a specified threshold.

In a further embodiment of the invention, cross-validation is additionally performed to assess how well the coupling performs with out-sample data, i.e., data that has not heretofore been used.

Table VII provides a schematic record layout for out-sample data for the non-interpretable system, wherein L denotes the number of out-sample records.

TABLE VII

| Out-Sample Data | out-sample inputs Unseen data for validating coupled system | | | out-sample outputs for $j^{th}$ non-interpretable system Computed for validation |
|---|---|---|---|---|
| Record | $x_1$ | $x_2$ | ... | $x_n$ | $y_j$ |
| 1 | $inp_{s+1,1}$ | $inp_{s+1,2}$ | ... | $inp_{s+1,n}$ | $targ_{s+1,j}$ |
| 2 | $inp_{s+2,1}$ | $inp_{s+2,2}$ | ... | $inp_{s+2,n}$ | $inp_{s+2,j}$ |
| . | . | . | ... | . | . |
| . | . | . | | . | . |
| . | . | . | | . | . |
| s | $inp_{s+L,1}$ | $inp_{s+L,2}$ | ... | $inp_{s+L,n}$ | $targ_{s+L,j}$ |

Table VIII provides a schematic record layout for out-sample data for an interpretable system having m functional links.

TABLE VIII

| Out-Sample Data | in-sample inputs Data for coupled interpretable systems: n + m inputs (n original inputs augmented by m functional links) | | | | | out-sample outputs for $j^{th}$ ... interpretable system |
|---|---|---|---|---|---|---|
| Record | $x_1$ | ... | $x_n$ | $x_{n+1} = f_1(x)$ | ... | $x_{n+m} = f_m(x)$ | $\hat{y}_j$ |
| s + 1 | $inp_{s+1,1}$ | ... | $inp_{s+1,n}$ | $f_1(inp_{s+1,1}, \ldots, inp_{s+1,n})$ | ... | $f_m(inp_{s+1,1}, \ldots, inp_{s+1,n})$ | $out_{1j}$ |
| s + 2 | $inp_{s+2,1}$ | ... | $inp_{s+2,n}$ | $f_1(inp_{s+2,1}, \ldots, inp_{s+2,n})$ | ... | $f_m(inp_{s+2,1}, \ldots, inp_{s+2,n})$ | $out_{2j}$ |
| . | . | ... | . | . | ... | . | . |
| . | . | | . | . | | . | . |
| . | . | | . | . | | . | . |
| s + L | $inp_{s+L,1}$ | ... | $inp_{s+L,n}$ | $f_1(inp_{s+L,1}, \ldots, inp_{s+L,n})$ | ... | $f_m(inp_{s+L,1}, \ldots, inp_{s+L,n})$ | $out_{sj}$ |

Out-sample coupling between interpretable and non-interpretable systems is achieved and the current set of functional links is considered acceptable when the difference between their corresponding outputs is less than a specified threshold.

Table IX provides a schematic record layout for out-sample data for the out-sample error comparisons.

TABLE IX

| Out-Sample Data | out-sample error Coupling between outputs of non-interpretable and interpretable system | | |
|---|---|---|---|
| Record | $\hat{y}_1 - y_1$ | ... | $\hat{y}_k - y_k$ |
| s + 1 | $out_{s+1,1} - targ_{s+1,1}$ | ... | $out_{s+1,k} - targ_{s+1,k}$ |
| s + 2 | $out_{s+2,1} - targ_{s+2,1}$ | ... | $out_{s+2,k} - targ_{s+2,k}$ |
| . | . | ... | . |
| . | . | | . |
| . | . | | . |
| s | $out_{s+L,1} - targ_{s+L,1}$ | ... | $out_{s+L,k} - targ_{s+L,k}$ |

Above, the invention compares the outputs of the interpretable systems (which uses out-sample inputs) with the outputs of the acceptable non-interpretable systems using the out-sample inputs and the augmented functional links. If the error is greater than a pre-defined tolerance, then the invention returns to the in-sample optimization using the previously "optimized" functional links as a starting point. If the error is less than a pre-defined tolerance, then the invention halts, i.e., the interpretable systems is coupled to the non-interpretable systems for the out-sample data, and the invention is confident that the explanations generated for the interpretable systems will be valid for the non-interpretable system.

The disclosure and examples provided herein are not to be construed so as to limit the invention. The narrative, embodiments, and examples are disclosed as illuminative guidance for the construction and/or operation of the invention.

What is claimed:

1. A method of developing one or more coupled systems comprising:
    providing one or more data sets, wherein the one or more data sets comprise at least one in-sample data sets comprising inputs, and zero or more out-sample data sets comprising inputs;
    providing one or more non-interpretable systems that process the one or more data sets to produce one or more non-interpretable outputs;
    providing one or more interpretable systems that process the one or more data sets to produce one or more interpretable outputs;
    providing one or more comparing systems that compare the interpretable outputs with the non-interpretable outputs to produce a metric, wherein the metric is an error value;
    using the error value to couple the one or more interpretable systems to the one or more non-interpretable systems, forming one or more coupled systems;
    wherein the comparing systems iterate and adapt by an augmentation of the data sets, wherein the augmentation of the data sets is performed by functional links, wherein the functional links comprise nonlinear transformations of the inputs of the at least one in-sample data sets and the inputs of the zero or more out-sample data sets;

produce one or more coupled interpretable systems until the error value is determined to be below a specified error tolerance, and the coupled interpretable systems are accepted and the comparing systems halt;

wherein the method is performed by execution of computer readable program code; and non-volatile processing circuitry.

2. The method of developing one or more coupled systems of claim 1, wherein the one or more non-interpretable systems is at least one of neural network systems, deep learning systems, convolutional neural network systems, recurrent neural network systems, non-interpretable support vector machine systems, artificial genetic systems, non-linear regression systems, non-parametric regression systems, or kernel regression systems.

3. The method of developing one or more coupled systems of claim 1, wherein the one or more interpretable systems is at least one of decision tree systems, interpretable support vector machine systems, case-based reasoning systems, evidenced-based reasoning systems, nearest-neighbor matching systems, interpretable genetic search systems, interpretable stochastic search systems, regression systems, linear regression systems, curvilinear regression systems, polynomial regression systems, basis function regression systems, logistical regression systems, delta rule systems, iterative regression systems, perceptron systems, iterative linear discriminant systems, interpretable explainable systems, interpretable ethical systems, interpretable fairness systems, interpretable accountable systems, interpretable transparent systems, or interpretable probabilistic systems.

4. The method of developing one or more coupled systems of claim 1 wherein the coupling is performed in a development mode or in a forensic mode.

5. A system for developing one or more coupled systems comprising:
providing one or more data sets, wherein the one or more data sets comprise at least one in-sample data sets comprising inputs and zero or more out-sample data sets comprising inputs;
providing one or more non-interpretable systems that process the one or more data sets to produce one or more non-interpretable outputs;
providing one or more interpretable systems that process the one or more data sets to produce one or more interpretable outputs;
providing one or more comparing systems that compare the interpretable outputs with the non-interpretable outputs to produce a metric, wherein the metric is an error value;
using the error value to couple the one or more interpretable systems to the one or more non-interpretable systems, forming one or more coupled systems;
wherein the comparing systems iterate and adapt by an augmentation of the data sets, wherein the augmentation of the data sets is performed by functional links, wherein the functional links comprise nonlinear transformations of the inputs of the at least one in-sample data sets and the inputs of the zero or more out-sample data sets;
produce one or more coupled interpretable systems until the error value is determined to be below a specified error tolerance, and the coupled interpretable systems are accepted and the comparing systems halt;
wherein the system is performed by execution of computer readable program code; and non-volatile processing circuitry.

6. The system for developing one or more coupled systems of claim 5 wherein the one or more non-interpretable systems is at least one of neural network systems, deep learning systems, convolutional neural network systems, recurrent neural network systems, non-interpretable support vector machine systems, artificial genetic systems, non-linear regression systems, non-parametric regression systems, or kernel regression systems.

7. The system for developing one or more coupled systems of claim 5 wherein the one or more interpretable systems at least one of decision tree systems, interpretable support vector machine systems, case-based reasoning systems, evidenced-based reasoning systems, nearest-neighbor matching systems, interpretable genetic search systems, interpretable stochastic search systems, regression systems, linear regression systems, curvilinear regression systems, polynomial regression systems, basis function regression systems, logistical regression systems, delta rule systems, iterative regression systems, perceptron systems, iterative linear discriminant systems, interpretable explainable systems, interpretable ethical systems, interpretable fairness systems, interpretable accountable systems, interpretable transparent systems, or interpretable probabilistic systems.

8. The system for developing one or more coupled systems of claim 5 wherein the coupling is performed in a development mode or in a forensic mode.

9. A system of systems for developing one or more coupled systems comprising:
providing one or more data sets, wherein the one or more data sets comprise at least one in-sample data sets comprising inputs and zero or more out-sample data sets comprising inputs;
providing one or more non-interpretable systems that process the one or more data sets to produce one or more non-interpretable outputs;
providing one or more interpretable systems that process the one or more data sets to produce one or more interpretable outputs;
providing one or more comparing systems that compare the interpretable outputs with the non-interpretable outputs to produce a metric, wherein the metric is an error value;
using the error value to couple the one or more interpretable systems to the one or more non-interpretable systems, forming one or more coupled systems;
wherein the comparing systems iterate and adapt by an augmentation of the data sets, wherein the augmentation of the data sets is performed by functional links, wherein the functional links comprise nonlinear transformations of the inputs of the at least one in-sample data sets and the inputs of the zero or more out-sample data sets;
produce one or more coupled interpretable systems until the error value is determined to be below a specified error tolerance, and the coupled interpretable systems are accepted and the comparing systems halt;
wherein the system of systems is performed by execution of computer readable program code; and non-volatile processing circuitry.

10. The system of systems for developing one or more coupled systems of claim 9 wherein the one or more non-interpretable systems is at least one of neural network systems, deep learning systems, convolutional neural network systems, recurrent neural network systems, non-interpretable support vector machine systems, artificial genetic systems, non-linear regression systems, non-parametric regression systems, or kernel regression systems.

11. The system of systems for developing one or more coupled systems of claim 9 wherein the one or more interpretable systems is at least one of decision tree systems, interpretable support vector machine systems, case-based reasoning systems, evidenced-based reasoning systems, nearest-neighbor matching systems, interpretable genetic search systems, interpretable stochastic search systems, regression systems, linear regression systems, curvilinear regression systems, polynomial regression systems, basis function regression systems, logistical regression systems, delta rule systems, iterative regression systems, perceptron systems, iterative linear discriminant systems, interpretable explainable systems, interpretable ethical systems, interpretable fairness systems, interpretable accountable systems, interpretable transparent systems, or interpretable probabilistic systems.

12. The system of systems for developing one or more coupled systems of claim 9 wherein the coupling is performed in a development mode or in a forensic mode.

\* \* \* \* \*